(12) United States Patent
Chauvel et al.

(10) Patent No.: US 7,330,937 B2
(45) Date of Patent: Feb. 12, 2008

(54) MANAGEMENT OF STACK-BASED MEMORY USAGE IN A PROCESSOR

(75) Inventors: Gerard Chauvel, Antibes (FR); Serge Lasserre, Frejus (FR); Dominique D'Inverno, Villeneuve Loubet (FR); Maija Kuusela, Mouans Sartoux (FR); Gilbert Cabillic, Brece (FR); Jean-Philippe Lesot, Etrelles (FR); Michel Banâtre, La Fresnais (FR); Jean-Paul Routeau, Thorigné-Fouillard (FR); Salam Majoul, Rennes (FR); Frédéric Parain, Rennes (FR)

(73) Assignee: Texas Instruments Incorporated, Dallas, TX (US)

( * ) Notice: Subject to any disclaimer, the term of this patent is extended or adjusted under 35 U.S.C. 154(b) by 497 days.

(21) Appl. No.: 10/818,584

(22) Filed: Apr. 5, 2004

(65) Prior Publication Data
US 2004/0260904 A1 Dec. 23, 2004

(30) Foreign Application Priority Data
Jun. 19, 2003 (EP) .................................. 03291504

(51) Int. Cl.
*G06F 12/00* (2006.01)
(52) U.S. Cl. ................ 711/132; 711/118; 711/144; 711/156; 711/170; 712/223; 712/224
(58) Field of Classification Search ................ 711/132, 711/118, 144, 156, 170; 712/223, 224
See application file for complete search history.

(56) References Cited

U.S. PATENT DOCUMENTS

| 7,024,520 B2 * | 4/2006 | Tierney et al. .............. 711/141 |
| 2002/0040429 A1 * | 4/2002 | Dowling ...................... 712/228 |
| 2002/0091916 A1 * | 7/2002 | Dowling ...................... 712/228 |
| 2004/0068616 A1 * | 4/2004 | Tierney et al. .............. 711/141 |

FOREIGN PATENT DOCUMENTS

| EP | 0 797 148 A | 9/1997 |
| EP | 1 111 511 A1 | 6/2001 |
| EP | 1 179 781 A2 | 2/2002 |
| EP | 1 182 566 A | 2/2002 |

OTHER PUBLICATIONS

"SCIMA: Software Controlled Integrated Memory Architecture For High Performance Computing", Kondo, et al., Computer Design, 2000. Proceedings. 2000 International Conference on Austin, Texas, USA, Sep. 17-20, 2000, Los Alamitos, CA, IEEE Comput. Soc, US, Sep. 17, 2000, pp. 105-111, XP010520089, ISBN: 0-7695-0801-4.

* cited by examiner

*Primary Examiner*—Stephen C. Elmore
(74) *Attorney, Agent, or Firm*—Ronald O. Neerings; Wade James Brady, III; Frederick J. Telecky, Jr.

(57) ABSTRACT

A method is disclosed that comprises determining whether a data subsystem is to operate as cache memory or as scratchpad memory in which line fetches from external memory are suppressed and programming a control bit to cause the data subsystem to be operated as either a cache or scratchpad memory depending on the determination. Other embodiments are disclosed herein as well.

34 Claims, 6 Drawing Sheets

| | |
|---|---|
| R0 | GENERAL PURPOSE (GP) |
| R1 | GENERAL PURPOSE (GP) |
| R2 | GENERAL PURPOSE (GP) |
| R3 | GENERAL PURPOSE (GP) |
| R4 | PROGRAM COUNTER (PC) |
| R5 | GENERAL PURPOSE/LOCAL VARIABLE POINTER (LV) |
| R6 | STACK POINTER (SP) |
| R7 | TOP OF STACK (ToS) |
| R8 | GENERAL PURPOSE/ADDRESS INDEX 0 (AI0) |
| R9 | GENERAL PURPOSE/ADDRESS INDEX 1 (AI1) |
| R10 | GENERAL PURPOSE (GP) |
| R11 | GENERAL PURPOSE (GP) |
| R12 | MICRO-PROGRAM COUNTER (MICRO-PC) |
| R13 | GENERAL PURPOSE (GP) |
| R14 | GENERAL PURPOSE/INDIRECT REGISTER INDEX (IRI) |
| R15 | STATUS AND CONTROL (ST) |

*FIG. 4*

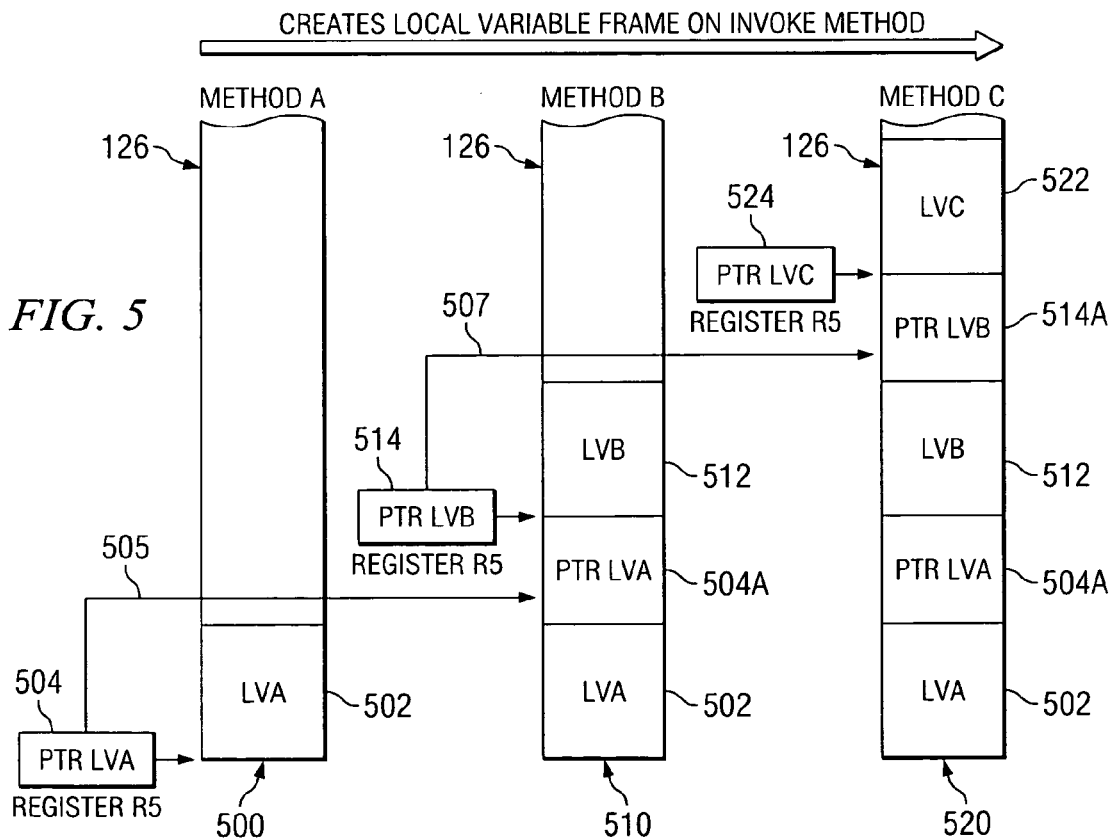

*FIG. 5*

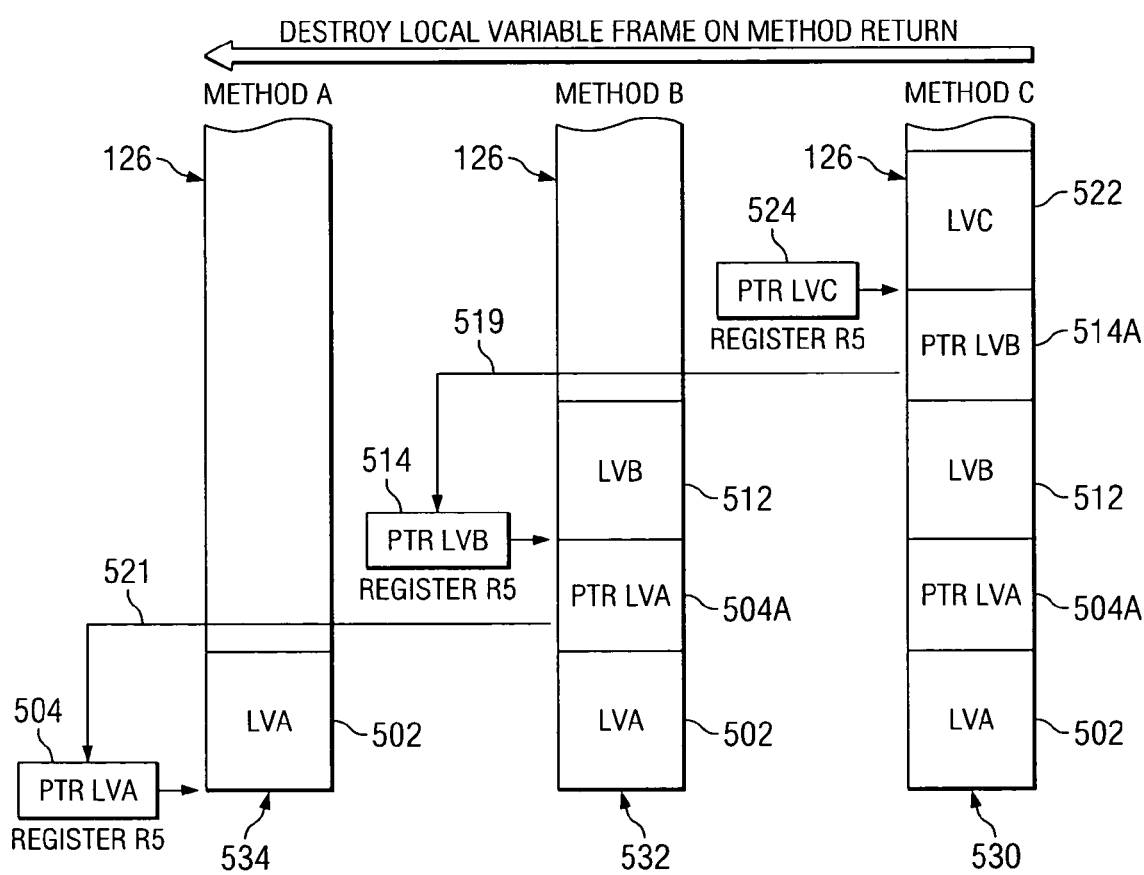

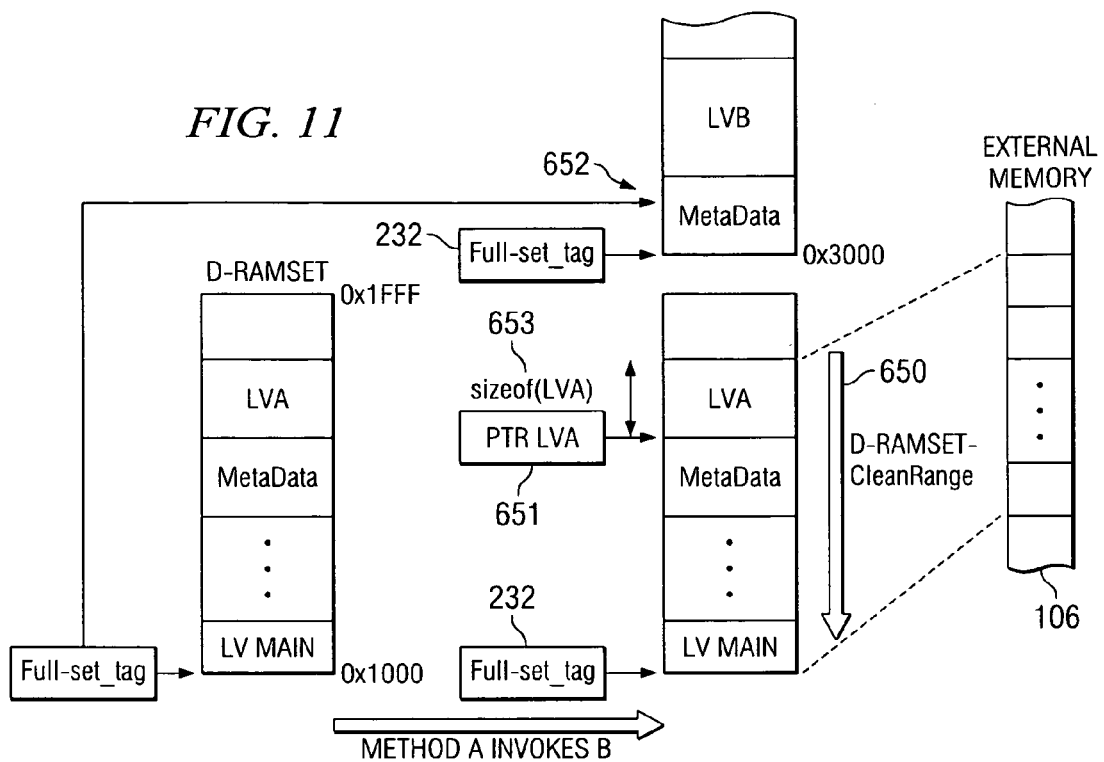
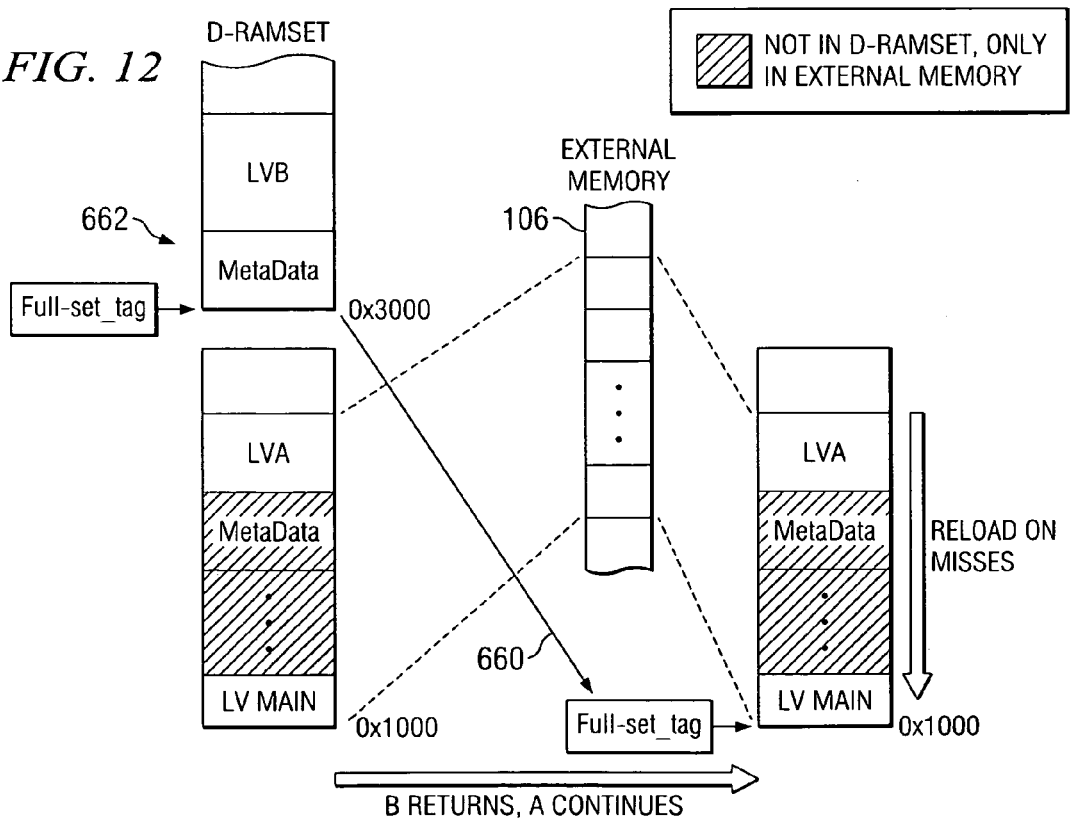

MANAGEMENT OF STACK-BASED MEMORY USAGE IN A PROCESSOR

BACKGROUND OF THE INVENTION

1. Technical Field of the Invention

The present invention relates generally to processors and more particularly to management of a stack-based memory usage in a processor.

2. Background Information

Many types of electronic devices are battery operated and thus preferably consume as little power as possible. An example is a cellular telephone. Further, it may be desirable to implement various types of multimedia functionality in an electronic device such as a cell phone. Examples of multimedia functionality may include, without limitation, games, audio decoders, digital cameras, etc. It is thus desirable to implement such functionality in an electronic device in a way that, all else being equal, is fast, consumes as little power as possible and requires as little memory as possible. Improvements in this area are desirable.

BRIEF SUMMARY

In some embodiments, a method comprises determining whether a data subsystem is to operate as cache memory or as scratchpad memory in which line fetches from external memory are suppressed and programming a control bit to cause the data subsystem to be operated as either a cache or scratchpad memory depending on the determination.

In other embodiments, a processor may comprise a processing core that generates memory addresses to access a main memory and on which a plurality of methods operate. Each method may use its own set of local variables. The processor may also include a cache subsystem that comprises a multi-line data memory that holds a contiguous block of memory defined by an address stored in a register. Local variables may be stored in the data memory. Each line has an associated valid bit and a dirty bit and the processor may implement a clean command that causes each line for which the valid and dirty bits indicate that the line contains valid and dirty data to be copied to memory external to said processor. In other embodiments, the processor may implement a flush command which invalidates some or all of the lines in the data memory and a set policy command which programs the allocation policy for the data memory.

NOTATION AND NOMENCLATURE

Certain terms are used throughout the following description and claims to refer to particular system components. As one skilled in the art will appreciate, semiconductor companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

BRIEF DESCRIPTION OF THE DRAWINGS

For a more detailed description of the preferred embodiments of the present invention, reference will now be made to the accompanying drawings, wherein:

FIG. 4 shows various registers used in the JSM of FIGS. 1 and 3;

FIG. 5 illustrates the storage of local variables and pointers in accordance with the preferred embodiments;

FIG. 6 illustrates the use of the local variable pointers upon returning from a method.

FIGS. 10 and 11 illustrate the operation of the RAMset in an overflow condition; and FIG. 12 illustrates the operation of the RAMset in an underflow condition.

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

The subject matter disclosed herein is directed to a programmable electronic device such as a processor having memory in which "local variables" associated with a stack-based language (e.g., Java) and pointers associated with the local variables may be stored. The term "local variables" refers to temporary variables used by a method that executes on the processor. Multiple methods may run on the processor and each method preferably has its own set of local variables. In general, local variables have meaning only while their associated method is running. The stack-based language may comprise Java Bytecodes although this disclosure is not so limited. In Java Bytecodes, the notion of local variables ("LVs") is equivalent to automatic variables in other programming languages (e.g., "C") and other termed variables in still other programming languages. This disclosure, however, is not limited to Java, Java methods, and Java local variables. The principles disclosed below are applicable to any system that manages a stack and includes "put block" and "pop block" operations to push a block of data onto a stack or pop a block of data from a stack.

The following describes the operation of a preferred embodiment of such a processor in which the methods and local variables may run and be used. Other processor architectures and embodiments may be used and thus this disclosure and the claims which follow are not limited to any particular type of processor. Details regarding the storage of the local variables and the associated pointers follow the description of the processor.

The processor described herein is particularly suited for executing Java™ Bytecodes, or comparable code. As is well known, Java is particularly suited for embedded applications. Java is a relatively "dense" language meaning that on average each instruction may perform a large number of functions compared to various other programming languages. The dense nature of Java is of particular benefit for portable, battery-operated devices that preferably include as little memory as possible to save space and power. The reason, however, for executing Java code is not material to this disclosure or the claims that follow.

Figure 1:
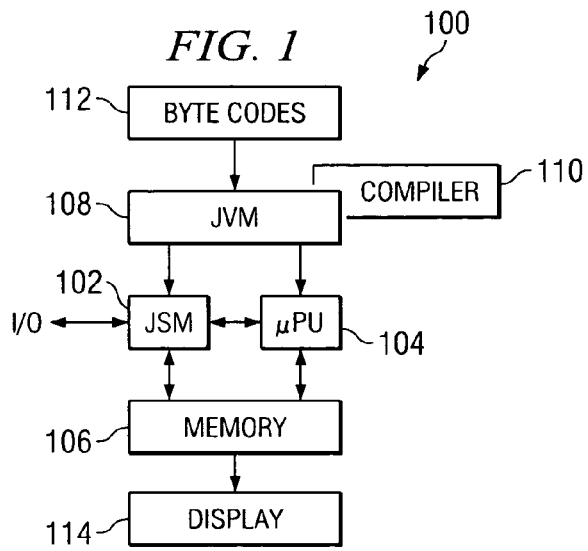
FIG. 1 shows a diagram of a system in accordance with preferred embodiments of the invention and including a Java Stack Machine ("JSM") and a Main Processor Unit ("MPU")
Figure 2:
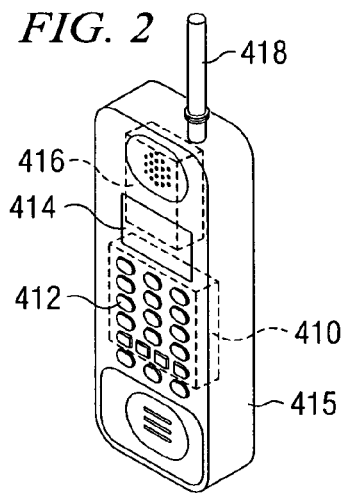
FIG. 2 depicts an exemplary embodiment of the system described herein in the form of a communication device (e.g., cellular telephone)

Referring now to FIG. 1, a system 100 is shown in accordance with a preferred embodiment of the invention. As shown, the system includes at least two processors 102 and 104. Processor 102 is referred to for purposes of processor 104 may be referred to as a Main Processor Unit ("MPU"). System 100 may also include memory 106 coupled to both the JSM 102 and MPU 104 and thus accessible by both processors. At least a portion of the memory 106 may be shared by both processors meaning that both processors may access the same shared memory locations. Further, if desired, a portion of the memory 106 may be designated as private to one processor or the other. System 100 also includes a Java Virtual Machine ("JVM") 108, compiler 110, and a display 114. The JSM 102 preferably includes an interface to one or more input/output ("I/O") devices such as a keypad to permit a user to control various aspects of the system 100. In addition, data streams may be received from the I/O space into the JSM 102 to be processed by the JSM 102. Other components (not specifically shown) may be included as desired. As such, while system 100 may be representative of, or adapted to, a wide variety of electronic systems, an exemplary electronic system may comprise a battery-operated, mobile cell phone such as that shown in FIG. 2. As shown in FIG. 2, a mobile communications device includes an integrated keypad 412 and display 414. The JSM 102 and MPU 104 noted above and other components may be included in electronics package 410 which may be coupled to keypad 410, display 414, and radio frequency ("RF") circuitry 416 which may be connected to an antenna 418.

Referring again to FIG. 1, as is generally well known, Java code comprises a plurality of "Bytecodes" 112. Bytecodes 112 may be provided to the JVM 108, compiled by compiler 110 and provided to the JSM 102 and/or MPU 104 for execution therein. In accordance with a preferred embodiment of the invention, the JSM 102 may execute at least some, and generally most, of the Java Bytecodes. When appropriate, however, the JSM 102 may request the MPU 104 to execute one or more Java Bytecodes not executed or executable by the JSM 102. In addition to executing Java Bytecodes, the MPU 104 also may execute non-Java instructions. The MPU 104 also hosts an operating system ("O/S") (not specifically shown), which performs various functions including system memory management, the system task management that schedules the JVM 108 and most or all other native tasks running on the system, management of the display 114, receiving input from input devices, etc. Without limitation, Java code may be used to perform any one of a variety of applications including multimedia, games or web based applications in the system 100, while non-Java code, which may comprise the O/S and other native applications, may still run on the system on the MPU 104.

The JVM 108 generally comprises a combination of software and hardware. The software may include the compiler 110 and the hardware may include the JSM 102. The JVM may include a class loader, bytecode verifier, garbage collector, and a bytecode interpreter loop to interpret the bytecodes that are not executed on the JSM processor 102.

In accordance with preferred embodiments of the invention, the JSM 102 may execute at least two instruction sets. One instruction set may comprise standard Java bytecodes. As is well-known, Java is a stack-based programming language in which instructions generally target a stack. For example, an integer add ("IADD") Java instruction pops two integers off the top of the stack, adds them together, and pushes the sum back on the stack. As will be explained in more detail below, the JSM 102 comprises a stack-based architecture with various features that accelerate the execution of stack-based Java code.

Another instruction set executed by the JSM 102 may include instructions other than standard Java instructions. This other instruction set generally complements the Java instruction set and, accordingly, may be referred to as a complementary instruction set architecture ("C-ISA"). By complementary, it is meant that the execution of various "complex" Java Bytecodes may be substituted by "micro-sequences" using C-ISA instructions that permit address calculation to readily "walk through" the JVM data structures.

Figure 3:
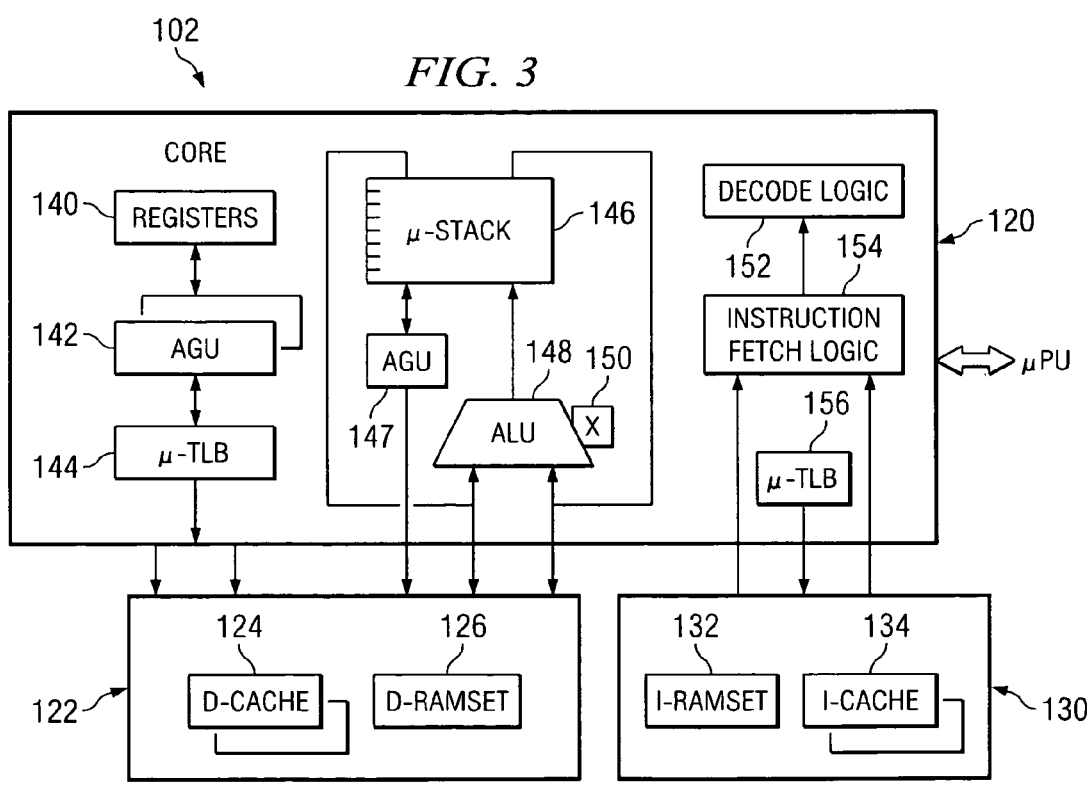
FIG. 3 shows a block diagram of the JSM of FIG. 1 in accordance with a preferred embodiment of the invention.

FIG. 3 shows an exemplary block diagram of the JSM 102. As shown, the JSM includes a core 120 coupled to data storage 122 and instruction storage 130. The core may include one or more components as shown. Such components preferably include a plurality of registers 140, three address generation units ("AGUs") 142, 147, micro-translation lookaside buffers (micro-TLBs) 144, 156, a multi-entry micro-stack 146, an arithmetic logic unit ("ALU") 148, a multiplier 150, decode logic 152, and instruction fetch logic 154. In general, operands may be retrieved from data storage 122 or from the micro-stack 146, processed by the ALU 148, while instructions may be fetched from instruction storage 130 by fetch logic 54 and decoded by decode logic 152. The address generation unit 142 may be used to calculate addresses based, at least in part on data contained in the registers 140. The micro-TLBs 144, 156 generally perform the function of a cache for the address translation and memory protection information bits that are preferably under the control of the operating system running on the MPU 104.

Referring now to FIG. 4, the registers 140 may include 16 registers designated as R0-R15. Registers R0-R3, R5, R8-R11 and R13-R14 may be used as general purposes ("GP") registers usable for any purpose by the programmer. Other registers, and some of the GP registers, may be used for specific functions. For example, registers R4 and R12 may be used to store two program counters. Register R4 preferably is used to store the program counter ("PC") and register R12 preferably is used to store a micro-program counter ("micro-PC"). In addition to use as a GP register, register R5 may be used to store the base address of a portion of memory in which Java local variables may be stored when used by the currently executing Java method. The top of the micro-stack 146 may be referenced by the values in registers R6 and R7. Registers R8 and R9 may also be used to hold the address index 0 ("AI0") and address index 1 ("AI1").

Register R14 may also be used to hold the indirect register index ("IRI"). Register R15 may be used for status and control of the JSM 102.

Referring again to FIG. 3, as noted above, the JSM 102 is adapted to process and execute instructions from a stack-based instruction set that may include Java Bytecodes. Java Bytecodes pop, unless empty, data from and push data onto the micro-stack 146. The micro-stack 146 preferably comprises the top n entries of a larger stack that is implemented in data storage 122.

The data storage 122 generally comprises data cache ("D-cache") 124 and a data random access memory ("D-RAMset") 126. Reference may be made to U.S. Pat. Nos. 6,826,652, 6,192,508, and 6,789,172, all of which are incorporated herein by reference. The stack (excluding the micro-stack 146 ), arrays and non-critical data may be stored in the D-cache 124, while Java local variables and associated pointers as explained below, as well as critical data and non-Java variables (e.g., C, C++) may be stored in D-RAMset 126. The instruction storage 130 may comprise instruction RAM ("I-RAMset") 132 and instruction cache ("I-cache") 134. The I-RAMset 132 may be used to store "complex" micro-sequenced Bytecodes or micro-sequences or predetermined sequences of code.

In accordance with a preferred embodiment of the invention, at least some applications executed by the JSM 102 comprise one or more methods. A "method" includes executable instructions and performs one or more functions. Other terms for "method" may include subroutines, code segments, and functions, and the term should not be used to narrow the scope of this disclosure.

A method (the "calling" method) may call another method (the "called" method). Once the called method performs its fiction, program control returns to the calling method. Multiple hierarchical levels of methods are possible as illustrated in FIG. 5 which illustrates the interaction between three methods (Method A, Method B, and Method C). For purposes of the example of FIG. 5, method A calls method B and method B calls method C. As such, method A is the calling method for method B which is the called method relative to method A. Similarly, method B is the calling method relative to method C which is considered the called method relative to method B.

A method may have one or more "local variables," as explained previously. Local variables may be used to temporarily store data or other information as the method performs its task(s). The local variables preferably are specific to the method to which the variables pertain. That is, method A's local variables ("LVA") are accessible generally by only method A and have meaning only to method A. Once method A completes, the method A local variables become meaningless. Similarly, LVB and LVC comprise local variables associated with methods B and C, respectively. Java Bytecodes refer to local variables using an index. The JVM maintains a local variables pointer ("PTR LV") which points to the base address of the memory containing the current method's local variables. To access a particular local variable, a suitable index value is added to the base address to obtain the address of the desired local variable. In general, the local variables associated one method may have a different size than the local variables associated with another method.

FIG. 5 generally shows the state of the D-RAMset 126 in accordance with a time sequence of events 500, 510, and 520 as each method B and C is invoked. In sequence 500, method A is invoked and storage space 502 is allocated for its local variables (LVA). A base pointer (PTR LVA) 504 also is determined or selected to point to the base portion of LVA storage space 502. Using the pointer PTR LVA, references may be made to any local variable within method A's local variable set 502 by computing an index or offset to the PTR LVA value.

Although a plurality of methods may run on the JSM 102, typically only one method is "active" at a time having its instructions actively being executed by the JSM 102. The base pointer of the currently active method preferably is stored in register R5 as noted previously. In general, the base pointer for the active method may be computed by the JVM 108 while executing the invoke bytecode of the active method.

Sequence 510 depicts the state of the D-RAMset 126 when method A calls method B. In accordance with the preferred embodiments of the invention, the local variables (LVB) associated with method B are stacked in storage space 512 generally adjacent LVA ("on top of" LVA when viewed as in FIG. 5). Following arrow 505, the base pointer for LVA (PTR LVA) preferably is also stored in the D-RAMset 126 adjacent (e.g., below) the LVB data at location 504A. Thus, the two local variable sets LVA and LVB may be separated by the base pointer (PTR LVA) for LVA and possibly other data. Once the base pointer 504 for LVA is stored adjacent (below) the reserved space for the LVB data set 502, register R5 is updated (i.e., loaded) with a base pointer 514 for use with the LVB data set.

Following arrow 507 to time sequence 520, when method C is invoked (called by method B), the base pointer for method B (PTR LVB) is stored in location 514A which may be on top of LVB and below PTR LVC as shown and register R5 is loaded with the base pointer 524 (PTR LVC) to the base of the LVC data set 522. Method C's local variables (LVC) are allocated to storage space 522 which generally is adjacent (on top of) LVB 512 and PTR LVB 514A as shown. The PTR LVB value is stored in location 514A according to a similar calculation as that described above.

FIG. 6 illustrates the return process as each method (Methods C and then B) completes and returns to its calling method (methods B and then A). Beginning with time sequence 530 in which the local variable frame comprises LVA, LVB, and LVC along with pointers PTR LVA and PTR LVB for LVA and LVB, method C completes. Control returns to method B and LVB's base pointer is loaded from location 514 into register R5 as shown by arrow 519 at time sequence 532 by accessing PTR LVB through a load instruction that include a fixed offset from PTR LVC as a target address. Then, when method B completes, LVA's pointer (PTR LVA) is loaded into register R5 from location 504A as illustrated by arrow 521 at time sequence 534. The base pointers may be retrieved from their locations in data cache 126 by loading the value located at the location pointed by the currently active method's base pointer minus an offset (e.g., 1).

In accordance with preferred embodiments of the invention, the D-RAMset 126 is configured to provide any one or more or all of the following properties. The implementation of the D-RAMset 126 to provide these properties is explained in detail below. The local variables and pointers stored in the D-RAMset 126 preferably are "locked" in place meaning that, although the D-RAMset 126 is implemented as cache memory, eviction of the local variables generally can be prevented in a controlled manner. The locking nature of the D-RAMset 126 may be beneficial while a method executes to ensure that no cache miss penalty is incurred. Additionally, write back of valid, dirty local variables to main memory 106 is avoided in at least some situations (specified below). Further, mechanisms can be employed in the event that the D-RAMset 126 has insufficient capacity to accommodate all desired local variables. Further still, once a method has completed, the portion of the D-RAMset allocated for the completed method's local variables remains marked as "valid." In this way, if and when such methods or any new methods are executed and re-use the RAMset space (such as that described in one or more of the copending applications mentioned above and incorporated herein by reference), such methods' associated local variables will be mapped to the same portion of the D-RAMset. If the RAMset lines are already marked as valid, access to those new local variables may not generate any misses. Retrieval of data from memory is unnecessary because the local variables only have significance while a method executes and a newly executing method first initializes all of its local variables before using them. Not generating misses and thus avoiding fetching lines from external memory reduces latency and power consumption. After a relatively short period of time following the start of a Java program execution, all relevant lines of the RAMset are marked as valid and accesses to local variables of newly called methods do not generate misses, thereby providing superior performance of a "0-wait state memory." Furthermore, the cache properties of RAMset allow discarding or saving of the data in main memory whenever required.

In accordance with a preferred embodiment of the invention, the local variables (LVA-LVC) and associated pointers (PTR LVA-PTR LVC) may be stored in D-RAMset 126. The D-RAMset 126 may be implemented in accordance with the preferred embodiment described below and in U.S. Pat. Nos. 6,192,508; 6,826,652, and 6,678,797, all of which are incorporated herein by reference.

As described in greater detail below, in the preferred embodiment, the data storage 122 (FIG. 3) preferably comprises a 3-way cache with at least one cache way comprising D-RAMset 126. The D-RAMset (or simply "RAMset") cache 126 may be used to cache a contiguous block of memory (e.g., local variables and pointers as described above) starting from a main memory address location. The other two cache ways 124 may be configured as RAMset cache memories, or use another architecture as desired. For example, the data storage 122 may be configured as one RAMset cache 126 and a 2-way set associative cache 124. As such, the data storage 122 generally comprises one or more forms of cache memory. The instruction storage 130 may be similarly configured if desired.

In operation, the processor's core 102 may access main memory 106 (FIG. 1) within a given address space. If the information at a requested address in main memory 106 is also stored in the data storage 122, the data is retrieved from the data cache 124, 126. If the requested information is not stored in data cache, the data may be retrieved from the main memory 106 and the data cache 124, 126 may be updated with the retrieved data.

Figure 7:
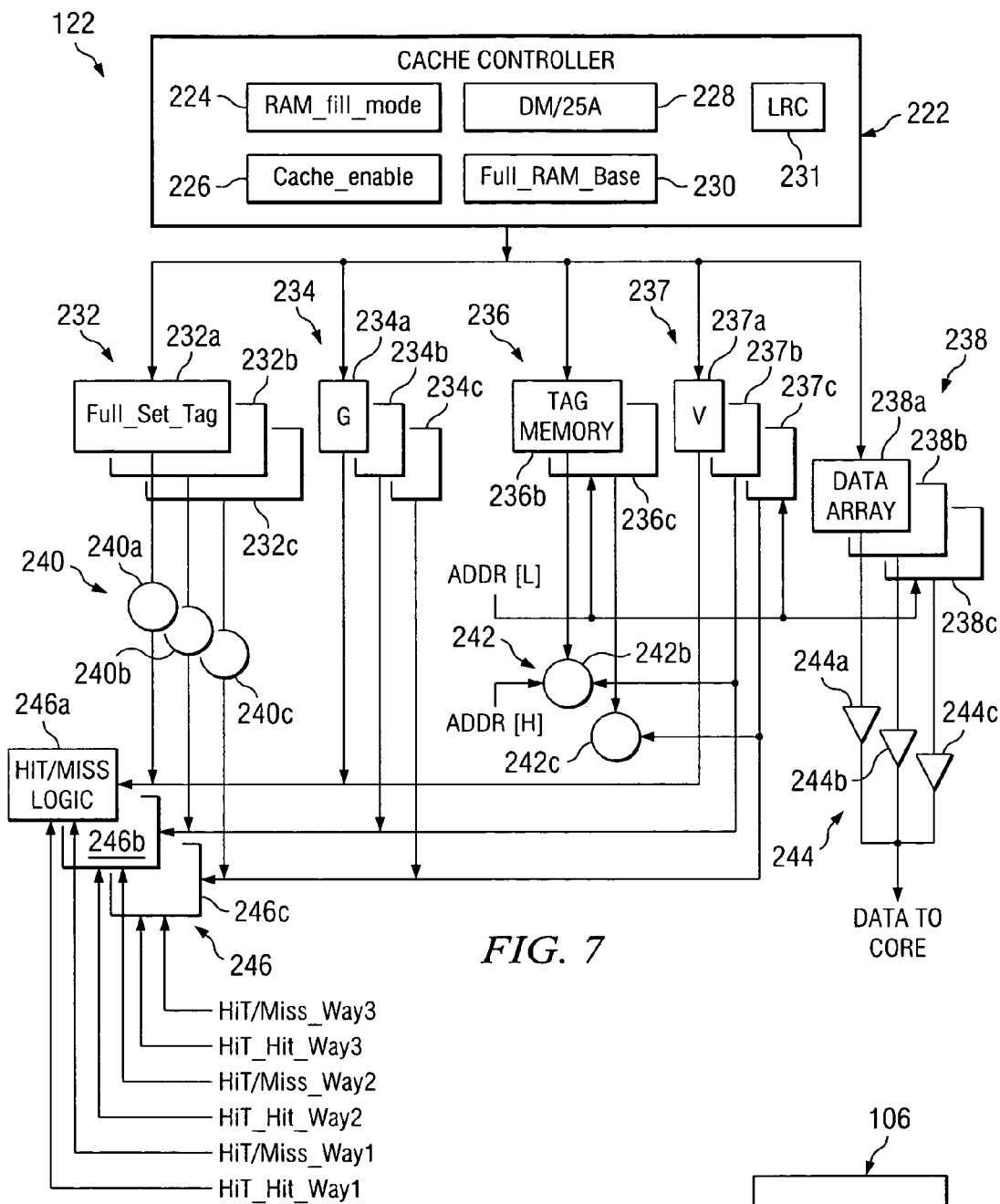
FIG. 7 illustrates a preferred embodiment of cache-based data storage (including a "RAMset") in the JSM of FIG. 3.

FIG. 7 illustrates a more detailed block diagram of the data storage 122 in accordance with a preferred embodiment with a RAMset cache and a two-way set associative cache. A cache controller 222 may control operation of the data storage 122. Cache controller 222 may include a plurality of status bits including, without limitation, the following four status bits:RAM_fill_mode 224, Cache_Enable 226, DM/2SA 228 and Full_RAM_base 230 and local RAM/cache ("LR/C") 231, as well as other bits that are not specifically shown in FIG. 7. The two-way associative cache may be configured as a direct map and its other way configured as a RAMset. Alternatively, the two-way set associative cache may be configured as two additional RAMsets depending on cache control bit DM/2SA 238 and FULL_RAM_Set_base 230 as described in at least one of the documents incorporated herein by reference. However, the preferred configuration comprises a single RAMset coupled to a standard data cache. The RAMset is not limited in size, nor must the RAMset have the same size as the other cache way. Therefore, if another RAMset is needed for capacity reasons, a single RAMset with a larger capacity may be preferred.

As shown, cache controller 222 couples to Full_Set_Tag registers 232 (individually referenced as registers 232a through 232c), Global_Valid bits 234 (individually referenced as bits 234a through 234c), tag memories 236 (individually referenced as tag memories 236b and 236c), valid entry bit arrays 237 (individually referenced as bit arrays 237a through 237c) and data arrays 238 (individually referenced as data arrays 238a through 238c). Comparators 240 (individually referenced as comparators 240a through 240c) may couple to respective Full_Set_Tag registers 232. Comparators 242 (individually referenced as comparators 242b and 242c) couple to respective tag memories 236. Output buffers 244 (individually referenced as buffers 244a through 244c) may couple to respective data arrays 238. Hit/Miss logic 246 (individually referenced as logic 246a through 246c) may couple to comparators 240, global valid bits 234, valid bits 237, RAM_fill_mode bit 224 and Cache_Enable bit 226.

In operation, data storage 122 may be configured using the control bits 224, 226, 228 and 230. The Cache_Enable 226 allows the data storage to be enabled or disabled, as in standard cache architecture. If the data storage 122 is disabled (e.g., Cache Enable=0), data read accesses may be performed on the main memory 106 without using the data storage 122. If the data storage 122 is enabled (e.g., Cache_Enable=1), data may be accessed in the data storage 122, in cases where such data is present in the data storage. If a miss occurs, a line (e.g., 16 bytes) may be fetched from main memory 106 and provided to the core 120.

The size of the data array 238a may be different than the size of the data arrays 238b, c for the other ways of the cache. For illustration purposes and without limiting this disclosure in any way, it will be assumed that data arrays 238b and 238c are each 8 Kbytes in size, configured as 512 lines, with each line holding eight two-byte data values. Data array 238a may be 16 Kbytes in size, configured as 1024 lines, each line holding eight, two byte data values. The ADDR[L] signals may be used to address one line of the data array 238 and valid bit array 237 (and tag memory 236, where applicable). Accordingly, for the 1024-line first way, ADDR[L] may include 10 bits [13:4] of an address from the core. For the 512-line second and third ways, ADDR[L] may include 9 bits [12:4] of an address from the core. The ADDR[H] signals define which set is mapped to a line. Thus, assuming a 4 Gbyte address space, ADDR[H] uses bits [31:14] of an address from the core for the first way and uses bits [31:13] for each of the second and third ways of the cache 130.

The tag memories 236 and comparators 242 may be used for a two-way set associative cache (e.g., D-cache 124 in FIG. 3). When the core 120 performs a memory access, the tag memories 236 are accessed at the low order bits of the address (ADDR[L]). The tag memory locations store the high order address bits of the main memory address of the information stored in a corresponding line of the data array 238. These high order address bits may be compared with the high order address bits (ADDR[H]) of the address from the core 120. If the ADDR[H] matches the contents of the tag memory at ADDR[L], a hit occurs if the valid bit associated with the low order bits indicates that the cache entry is valid. If a cache hit occurs, the data from the corresponding data array 238 at ADDR[L] may be provided to the core 120 by enabling the corresponding output buffer 244. As described below, data from the two-way cache is presented to the core 120 if there is a miss in the RAMset cache. By itself, the operation of the two-way set associative cache and the direct map cache may be conventional and may not be affected by the RAMset cache 126. Other cache techniques could also be used in place of the two-way cache 124.

Figure 8:
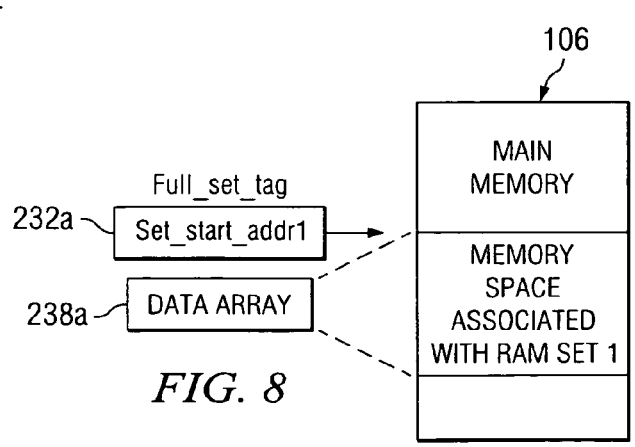
FIG. 8 illustrates the mapping of a contiguous block of main memory onto a RAMset.

The RAMset cache 126 preferably stores a contiguous block of main memory 106 starting at an address defined by the Full_set_tag register 232 for the RAMset. This contiguous block of information (e.g., local variables/pointers) may be mapped to the corresponding data array 238 of the RAMset. In at least some embodiments, only the high order bits of the starting address are stored in the Full_set_tag register 232. FIG. 8 illustrates this mapping for a single RAMset. As shown, the contents of Full_set_tag register 232a define the starting address for a contiguous block of memory cached in data array 238a.

Referring again to FIG. 7, a RAMset miss may occur when the high order bits of the address from the core 120 do not match the contents of the Full_set_TAG register 232 or the global valid bit is "0". In either case, when a RAMset miss occurs, the data storage 122 may behave like conventional, two-way cache logic. As such, if there is a hit in the two-way associative cache, then data is presented to the core 120 from the two-way set associative cache. Otherwise, the data is retrieved from main memory 106, forwarded to the core and loaded into a "victim" entry of the two-way associative cache.

A RAMset hit situation may occur when the high order bits of the address from the core 120 match the contents of the Full_set_TAG register 232 and the global valid bit equals "1" (the setting of the global valid bit is described in greater detail below). By default, the RAMset comparison preferably has higher priority than the other cache ways. A hit situation indicates that the requested data is mapped into the RAMset. If the Valid entry bit 237 corresponding to the line containing the data is set to "1", comparator 240 causes hit/miss logic 246 to generate a "hit-hit" signal because the address hit the RAMset and the data is present in the RAMset. If the corresponding valid bit 237 of the RAMset entry is "0", logic 240 generates a "hit-miss" because the address hit the RAM set, but the data is not yet present in the RAM set. In this latter case, the data may be fetched from main memory 106 and loaded into the data array 238 of the RAMset. A hit in the RAMset logic preferably takes precedence over the normal cache logic. The standard logic of the two-way cache generates a miss when the RAMset logic generates a hit. Information can reside in both the RAMset and the two-way cache without causing any misbehavior; the duplicated cache entry in the 2-way cache will eventually be evicted by the replacement mechanism of the two-way cache because such data will not be used. However, in the preferred embodiment the data mapped onto a RAMset is first removed from the cache to avoid a data coherency problem. When configured as a RAMset, data array 238a, b, c can be configured as a local RAM or as a cached segment depending on the setting of a suitable configuration bit (e.g., LR/C bit 231). However, even when configured as a local RAM, individual valid bits may be updated but misses do not generate accesses to the external memory.

To configure a RAMset for operation, the Full_set_tag register 232 preferably is loaded with a start address (set_start_addr) and the RAM_fill_mode bit 224 is configured to a desired fill mode. The circuitry for filling the cache can be the same as that used to fill lines of the set associative cache. At least one fill mode may be implemented and is referred to as a "line-by-line" fill mode as described below. Other fill modes may be implemented if desired such as the "set fill" mode described in at least one of the documents incorporated by reference.

For the line-by-line fill (RAM_fill_mode=0), the global valid bit 34 is set to "1" and each of the valid entry bits 237 is set to "0" when the Full_set tag register 232 is loaded with the starting address. At this point, the data array 238 is empty (it is assumed that the Cache_Enable bit 226 is set to "1" to allow operation of the data storage 122). Upon receiving an address from the core 120, a valid entry bit 237 is selected based on the low order bits of the address. As provided above, if the RAMset is 16 Kbytes in size, organized as an array of 1K×16 bytes, where 16 bytes is equivalent to a block line in the associated 2-way cache, the Full_set_TAG register 232 may store 18 bits [31:14] of the starting address. The address indexing each entry of the RAMset (ADDR[L]) may include 10 bits [13:4] while the data address used to access one data value in the line may include 4 bits [3:0] (assuming data accesses are 1 byte). In Java, local variables comprise four byte entities but, as explained previously, the RAMset may be shared between local variables and other, possibly critical, data. A line of the data array 238 (at ADDR[L]) is loaded from main memory 106 each time that a hit-miss situation occurs because the comparator 240 determines a match between ADDR[H] and the content of Full_set_TAG, the Global valid bit 34 is set to "1" and the valid bit 237 associated with the line at ADDR[L] is "0". This situation indicates that the selected line is mapped to the RAMset, but has not yet been loaded into the RAMset's data array 238. When the line is loaded into the data array 238 from main memory 106, the valid bit 237 corresponding to the line is set to "1".

This loading procedure (resulting in the valid bit being set to indicate the presence of valid data) has the same time penalty as a normal cache line load, but the entry will remain locked in the RAMset (i.e., the valid bit will remain set) unless the content of the Full_Set_Tag is changed and, therefore, the processing device will not be penalized on a subsequent access. As such, the lines used by a completed method remain valid so that re-using the lines by subsequent methods does not necessitate accesses to main memory 106. Further, freeing the local variable space for a completed method generally only involves disregarding the relevant base pointer. Further still, there is no need to copy back local variables upon to main memory 106 upon completion of a method because such extinct local variables are not used any more.

In some situations, the capacity of the D-RAMset 126 may not be sufficient to hold all desired local variables. In accordance with at least one embodiment, excess local variables may be stored in the non-D-RAMset data arrays 238. In accordance with other embodiments, a larger block of local variables (i.e., larger than just the excess local variables) may be mapped to the non-D-RAMset cache ways. During the "invoke" bytecodes, that initiates a method call, the local variable size of the called method is known by the JVM 108. The JVM also knows the total RAMset size (via a readable configuration register) and the RAMset size already utilized. Therefore, based on this information, the JVM may or may not decide to map the new local variable area onto the RAMset. A method may have a large chunk of local variables and not use them on each call. Therefore, mapping those local variables onto the RAMset may force unnecessary RAMset management of the base pointer and saving/restoring of local variables of calling methods or may cause more frequent overflow of a subsequently called method. Instead, the JVM 108 may map the methods with larger chunks of local variables onto the non-RAMset data cache and thus preserve more space in the RAMset for methods with a smaller number of local variables. In some embodiments, many methods may have less than 10 local variables and almost all methods have less than about 40 local variables, but, of course, these numerical characterizations are application dependent. For methods with many local variables, the system may map those local variables outside the RAMset avoiding penalizing other methods. This technique is generally transparent for the return mechanism because of the management of the PTR_LV of the calling method. Upon completion of a method, the lines containing that method's local variables may remain marked as valid. As noted above, maintaining such lines marked as valid avoids generating misses in calls of new methods.

Figure 9:
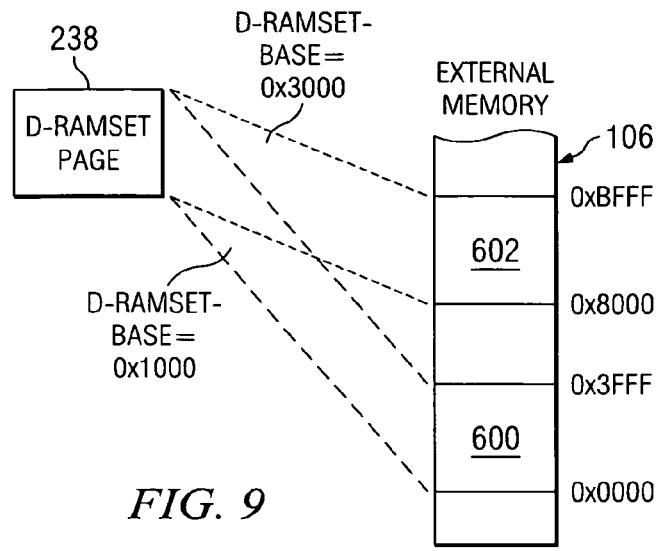
FIG. 9 illustrates another mapping of a contiguous block of main memory onto a RAMset.

In accordance with some embodiments, more than one contiguous block of external memory 106 may be mapped onto the D-RAMset's data array 238. As illustrated in FIG. 9, for example, two contiguous blocks 600 and 602 of external memory 106 may be mapped onto the D-RAMset 126. Block 600 comprises 16K of contiguous bytes from the address range of 0x0000 to 0x3FFF. Similarly, block 602 comprises 16K of contiguous bytes from the address range of 0x8000 to 0xBFFF. One block 600, 602 at a time may be mapped onto the D-RAMset 126 by reprogramming the D-RAMset's Full_set_tag register 232 as explained previously.

A plurality of commands may be implemented in connection with the data storage 122. Such commands may include, without limitation, D-RAMset-Clean, D-RAMset-Flush, and D-RAMset-policy-set. In addition to valid bits 237 for each line, a dirty bit also may be provided to indicate whether or not the line contains dirty data The D-RAMset-Clean command may be performed by examining the valid and dirty bits associated with each line. The D-RAMset-Clean command then copies back to external memory 106 only those lines that have valid and dirty data In embodiments without dirty bits, the D-RAMset-Clean preferably copies all valid entries from D_RAMset 126 to external memory 106. The D-RAMset-Flush command invalidates lines within the D-RAMset 126 by clearing the relevant valid bits 237. The D-RAMset-Clean and D-RAMset-Flush commands may be performed in one of at least three variations. In one variation, the D-RAMset-Clean and D-RAMset-Flush commands perform their respective actions on all of the lines of the D-RAMset 126 (D-RAMset-CleanAll and D-RAMset-FlushAll). In another variation, the D-RAMset-Clean and D-RAMset-Flush commands perform their respective actions on just those lines in the D-RAMset 126 that fall within a range of addresses specified as operands in the commands (D-RAMset-CleanRange and D-RAMset-FlushRange). A third variation permits the D-RAMset-Clean and D-RAMset-Flush commands to act on a single address within the D-RAMset 126 (D-RAMset-CleanEntry and D-RAMset-FlushEntry) providing the corresponding data address to be saved or invalidated.

The D-RAMset-policy-set command preferably specifies whether a data array 238 configured as a RAMset is to function as a Local RAM or as cache. The D-RAMset-policy-set command may set a bit in a register to indicate how a data array 238 is to be used. The bit that is set by the D-RAMset-policy-set command may comprise a bit in the status register R15, the LR/C bit 231 in a register in the cache controller 222 as shown on FIG. 7, or in another control register (not specifically shown) in the JSM 102. Once the bit is set to specify the desired behavior of the associated data array, the cache controller 222 reads the state of the bit to determine the desired allocation policy to implement. The bit may be set, for example, to specify a Local RAM behavior (referred to as "scratchpad"). In that mode, fetches from external memory are eliminated as explained above. Alternatively, the bit may be set so as to specify a cache-based allocation policy in which fetches from external memory are performed on misses before accessing the target data. The execution of the D-RAMset-policy-set command may be performed dynamically during run-time.

Figure 10:
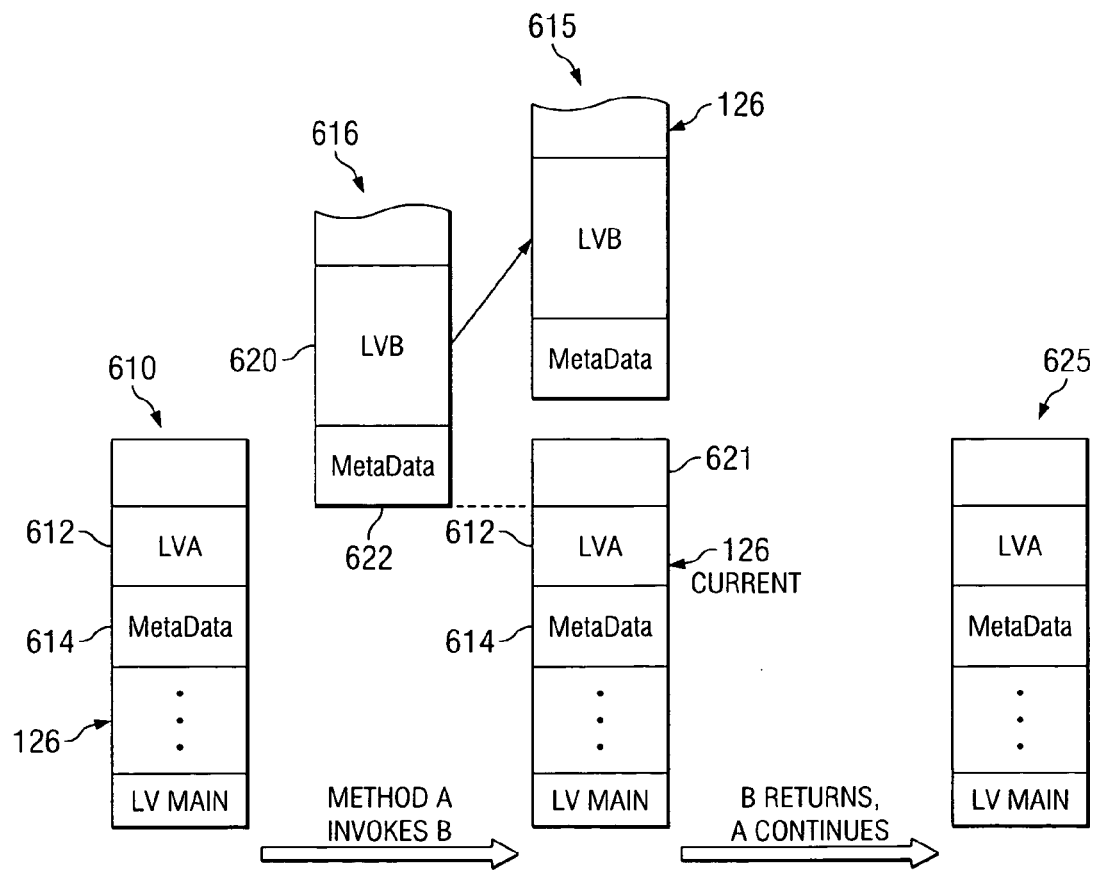

FIG. 10 illustrates an overflow condition. At 610, the D-RAMset 126 may comprise local variables 612 associated with a method A and associated metadata 614. The metadata 614 may comprise various runtime dependent data and local variable pointers as described previously. At 615, method A invokes method B. In this example, the size of method B's local variables 620 and metadata 622 in memory block 616 is greater than the amount of memory 621 available for allocation to local variables in the current D-RAMset which is identified as $126_{current}$. In accordance with some embodiments of the invention, method B's local variables and metadata may be mapped to the two-way set associative cache as explained previously. In accordance with other embodiments, a new memory page may be allocated and mapped onto the D-RAMset 126 such as that depicted in FIG. 9. Remapping the D-RAMset 126 may include saving off one or more local variables and metadata as desired from the RAMset's current data. If the size of method B's local variables is greater than the total size of the D-RAMset 126, then only a portion of method B's local variables are stored in the D-RAMset. At any rate, at 625 when method B completes and returns, the JVM 108 preferably re-maps the D-RAMset with method A's local variables and metadata.

Referring now to FIG. 11, an overflow condition may be handled as follows and may also be applicable upon a context switch. At 650, before switching to a new memory page, all local variables and associated metadata from the unfinished method(s) present in the D-RAMset 126 preferably are copied to external memory 106 preferably using the D-RAMset-CleanRange command. As explained above, this command comprises the D-RAMset-Clean command and operands that specify a range of addresses to clean (copy back to external memory 106). The range of addresses to be cleaned include those addresses from the base address stored in the Full_set_tag register 232 to an address corresponding to the sum of the local variable pointer (PTR LV) 651 and a value 653 that corresponds to the size of the current local variable space. Alternatively, the D-RAMset-CleanAll command could be used to clean the entire D-RAMset. Further still, one or more repetitions of the D-RAMset-CleanEntry command may be performed to clean the desired range. At 652, a new page preferably is allocated to the D-RAMset 126. The previous value of the Full_set_tag register 232 is saved in the new metadata stored in the D-RAMset and the Full_set_tag register 232 is reprogrammed with a new page base address. Finally, the D-RAMset policy preferably is set to Local RAM (scratchpad) mode as described above. This functionality may be implemented as in the following example in an invoke code sequence:

```
...
If ( OutOfSpace (DRamSetBase, nbrLV) )          //Out of space
    DRamSetPage *newPage = allocaPage( );       //allocate page
    NewPage.oldPage = dRamSetBase;              //save old page
    NewPage.firstLV =newLV = DRamSetBase +. . . ;  //compute new LVPtr
    DRamSetClean(DramSetBase);                  //copy back modification
    DRamSetBase = newPage;                      //Set new page as RAMSet
    DRamSetPolicy(DRamSet_SCRATCHPAD);          //Set Scratchpad policy
}
else
    newLV +=. . . ;                             //compute new LV
newPage.meta[. . . ].oldLVPtr = LVPtr;          //save LV
LVPtr = newLV;                                  //set new LV
...
```

FIG. 12 illustrates an underflow condition and may also be applicable upon a context switch. A return from a method may prompt a D-RAMset change to a different page (e.g., a page previously mapped to the RAMset 126). In general, management of the reloading of the D-RAMset preferably comprises fetching values from external memory 106 only on the first access of each relevant line. As described herein, the JSM 102 includes the ability to dynamically set the load policy. In accordance with preferred embodiments of the invention, this reloading of the D-RAMset underflow situation may be handled as follows. At 660, the previous value of the D-RAMset base (described above as being stored in metadata from the Full_set_tag register 232) is retrieved from the D-RAMset's metadata and reloaded into the Full_set_tag register 232. At 662, before restoring the previously saved local variable and metadata values, the data in the D-RAMset 126 preferably is invalidated by the D-RAMset-FlushAll command (invalidates the entire D-RAMset). Finally, the D-RAMset allocation policy is configured to the cache mode to permit fetches to occur from external memory 106 the first time an access to a particular line is made. This functionality may be implemented as in the following example in a return code sequence:

```
...
if( LVPtr == DramSetPage.firstLV) {             //If no previous LV in RAMSet
    DRamSetPage *oldPage =
        DRamSetBase.oldPage;                    //Remind old DRAMSet @
    LVPTr = oldPage.meta[. . . ].oldLVPTr;      //Restore previous LV
    DRamSetFlush(DramSetBase);                  //Discard old values
    DRamSetBase = oldPage;                      //Set previous RAMSet base
    DRamSetPolicy(DRamSet_CACHE);               //Set Cache policy
}
else
    LVPTr = DRamSetPage.meta[. . . ].oldLVPtr;  //Restore previous LV
```

While the preferred embodiments of the present invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above. Each and every claim is incorporated into the specification as an embodiment of the present invention.

What is claimed is:

1. A method, comprising:
    determining whether a data subsystem is to operate as cache memory or as scratchpad memory wherein for scratchpad memory line fetches from external memory are suppressed; and
    programming a control bit to cause the data subsystem to be operated as either a cache or scratchpad memory depending on the determination.

2. The method of claim 1 further including re-programming the control bit upon pushing a block of data onto a stack.

3. The method of claim 1 further including re-programming the control bit upon popping a block of data from a stack.

4. The method of claim 1 further including re-programming the control bit upon an occurrence of a method call and upon a subsequent return from the method call.

5. The method of claim 1 including programming the control bit to cause the data subsystem to operate as scratchpad memory upon a first invocation of a method.

6. The method of claim 1 further including programming the control bit to cause the data subsystem to operate as a cache when a program returns to a method that was previously called and for whose local variables were saved to memory external from the processor data subsystem.

7. The method of claim 6 including determining an overflow condition and saving the local variables to the external memory in response to the overflow condition.

8. The method of claim 6 including determining a context switch and saving the local variables to the external memory in response to the context switch.

9. The method of claim 1 including restoring data from system memory to the data subsystem configured as a cache memory upon an underflow or upon a context switch, wherein restoring the data occurs when a miss occurs in the scratchpad memory.

10. The method of claim 1 further including detecting an overflow in the data subsystem configured as scratchpad or a cache memory and not invalidating the scratchpad memory when the overflow occurs.

11. The method of claim 1 further including detecting an underflow in the data subsystem configured as a scratchpad or as a cache memory and invalidating the contents of the data subsystem and configuring the data subsystem as a cache.

12. A processor, comprising:
a processing core that generates memory addresses to access a main memory and on which a plurality of executable methods operate, each method using its own set of local variables; and
a cache subsystem comprising a multi-line data memory that holds a contiguous block of memory defined, at least in part, by an address stored in a register, wherein local variables are stored in said data memory;
wherein each line has an associated valid bit and a dirty bit and wherein said processor implements a clean command that causes each line for which the valid and dirty bits indicate that the line contains valid and dirty data to be copied to memory external to said processor.

13. The processor of claim 12 wherein said clean command only copies a single line having valid and dirty data from the data memory to external memory, wherein the single line is specified as part of the clean command.

14. The processor of claim 12 wherein said processor further implements a policy set command which programs an allocation policy associated with the data memory to be one of at least two policies, one policy permitting fetches from external memory to occur upon a data memory underflow condition occurring and another policy avoids fetching from external memory upon misses occurring.

15. The processor of claim 12 wherein said processor further implements a flush command which invalidates all lines in said data memory.

16. The processor of claim 12 wherein said processor further implements a flush command which invalidates all lines in said data memory between a range of addresses.

17. The processor of claim 12 wherein said processor further implements a flush command which invalidates a single specified line in said data memory.

18. The processor of claim 12 wherein the clean command is performed upon re-mapping a new page of external memory to the data memory.

19. The processor of claim 12 wherein said clean command automatically copies all lines having valid and dirty data from said data memory to external memory.

20. The processor of claim 12 wherein said clean command only copies lines having valid and dirty data within a specified range of addresses from the data memory to external memory.

21. A processor, comprising:
a processing core that generates memory addresses to access a main memory and on which a plurality of executable methods operate, each method using its own set of local variables; and
a cache subsystem comprising a multi-line data memory that holds a contiguous block of memory defined, at least in part, by an address stored in a register, wherein local variables are stored in said data memory;
wherein said processor implements a policy set command which programs an allocation policy associated with the data memory to be one of at least two policies, one policy permitting fetches from external memory to occur upon a data memory underflow condition occurring and another policy avoids fetching from external memory upon misses occurring.

22. The processor of claim 21 wherein said processor further implements a flush command which invalidates all lines in said data memory.

23. The processor of claim 21 wherein said processor further implements a flush command which invalidates all lines in said data memory between a range of addresses.

24. The processor of claim 21 wherein said processor further implements a flush command which invalidates a single specified line in said data memory.

25. A method usable in conjunction with a processor, comprising:
performing a first command that copies lines of a data memory comprising valid and dirty data to memory external to said processor; and
performing a second command that programs the allocation policy for a data memory in the processor to be a policy by which misses do not cause a fetch from external memory to be performed.

26. The method of claim 25 further including determining whether the data memory has sufficient capacity to store new data.

27. The method of claim 26 wherein performing the first command occurs upon determining that the data memory does not have sufficient capacity to store new data.

28. A system, comprising:
a first processor;
a second processor coupled to the first processor;
memory coupled to and external to both of said first and second processors;
wherein said second processor comprises:
a processing core that generates memory addresses to access a main memory and on which a plurality of executable methods operate, each method using its own set of local variables; and
a cache subsystem comprising a multi-line data memory that holds a contiguous block of memory defined, at least in part, by an address stored in a register, wherein local variables are stored in said data memory;
wherein each line has an associated valid bit and a dirty bit and wherein said processor implements a clean command that causes each line for which the valid and dirty bits indicate that the line contains valid and dirty data to be copied to memory external to said processor.

29. The system of claim 28 further including an antenna and said system comprises a wireless communication device.

30. A processor, comprising:
a processing core that generates memory addresses to access a main memory external to the processor; and
a cache subsystem comprising a multi-line data memory that holds a contiguous portion of memory defined, at least in part, by an address stored in a register, wherein blocks of data can be stored in said data memory;
wherein each line has an associated valid bit and a dirty bit and wherein said processor implements a clean command that causes each line for which the valid and dirty bits indicate that the line contains valid and dirty data to be copied to the main memory.

31. The processor of claim 30 further comprising a control bit which can be configured to cause the data memory function as a cache or configured to cause the data memory to function as a scratchpad.

32. The processor of claim 31 wherein the control bit is configured upon pushing a block of data onto a stack.

33. The processor of claim 31 wherein the control bit is configured upon popping a block of data from a stack.

34. The processor of claim 31 wherein the blocks of data comprise local variables associated with a stack-based programming language.

* * * * *